US009184948B2

(12) United States Patent
Chen et al.

(10) Patent No.: US 9,184,948 B2
(45) Date of Patent: Nov. 10, 2015

(54) DECISION FEEDBACK EQUALIZER ('DFE') WITH A PLURALITY OF INDEPENDENTLY-CONTROLLED ISOLATED POWER DOMAINS

(71) Applicant: INTERNATIONAL BUSINESS MACHINES CORPORATION, Armonk, NY (US)

(72) Inventors: Minhan Chen, Cary, NC (US); Steven M. Clements, Raleigh, NC (US); Carrie E. Cox, Apex, NC (US); Todd M. Rasmus, Cary, NC (US)

(73) Assignee: GLOBALFOUNDRIES U.S. 2 LLC, Hopewell Junction, NY (US)

( * ) Notice: Subject to any disclaimer, the term of this patent is extended or adjusted under 35 U.S.C. 154(b) by 84 days.

(21) Appl. No.: 13/903,199

(22) Filed: May 28, 2013

(65) Prior Publication Data

US 2014/0355661 A1 Dec. 4, 2014

(51) Int. Cl.

| | |
|---|---|
| ***H03H 7/30*** | (2006.01) |
| ***H03H 7/40*** | (2006.01) |
| ***H03K 5/159*** | (2006.01) |
| ***H04L 25/03*** | (2006.01) |

(52) U.S. Cl.

CPC ................................ *H04L 25/03146* (2013.01)

(58) Field of Classification Search

CPC .. H04L 25/03057; G06F 1/3203; G02B 26/10

See application file for complete search history.

(56) References Cited

U.S. PATENT DOCUMENTS

| | | | | |
|---|---|---|---|---|
| 5,664,089 | A * | 9/1997 | Byers et al. | 714/14 |
| 6,192,072 | B1 | 2/2001 | Azadet et al. | |
| 7,152,796 | B2 | 12/2006 | Dickson et al. | |
| 7,715,474 | B2 | 5/2010 | Park et al. | |
| 7,782,935 | B1 | 8/2010 | Wong et al. | |
| 7,792,187 | B2 | 9/2010 | Bulzacchelli | |
| 7,809,054 | B2 | 10/2010 | Carballo et al. | |
| 7,869,498 | B2 | 1/2011 | Zeng et al. | |
| 2009/0016548 | A1 * | 1/2009 | Monat et al. | 381/111 |
| 2010/0098147 | A1 * | 4/2010 | Miller | 375/233 |
| 2010/0128550 | A1 * | 5/2010 | Lovett | 365/226 |
| 2014/0253190 | A1 * | 9/2014 | Chen et al. | 327/143 |

* cited by examiner

*Primary Examiner* — Sam K Ahn

*Assistant Examiner* — Fabricio R Murillo Garcia

(74) *Attorney, Agent, or Firm* — Edward J. Lenart; Yuanmin Cai; Kennedy Lenart Spraggins LLP

(57) ABSTRACT

A Decision Feedback Equalizer ('DFE') that includes: a plurality of input signal lines comprising at least one data signal line and a plurality of power control signal lines; at least one output signal line; and a plurality of independently-controlled isolated power domains, where each independently-controlled isolated power domain is coupled to a corresponding one of the power control signal lines, each of the power control signal lines configured to transmit a power control signal to the independently-controlled isolated power domain dynamically, and each independently-controlled isolated power domain selectively consumes power in response to the power control signal, each independently-controlled isolated power domain configured to be dynamically powered up or powered down without impacting signal processing operations.

17 Claims, 6 Drawing Sheets

DFE 152
ICIPD 144
DSL 100
PCSL 102
Summer 104
DCVS Latch 106
CMOS Latch 108
ICIPD 146
DSL 112
PCSL 114
Summer 116
DCVS Latch 118
CMOS Latch 120
OSL 142
ICIPD 148
CSL 122
PCSL 124
Summer 126
DCVS Latch 128
CMOS Latch 130
ICIPD 150
DSL 132
PCSL 134
Summer 136
DCVS Latch 138
CMOS Latch 140

DECISION FEEDBACK EQUALIZER ('DFE') WITH A PLURALITY OF INDEPENDENTLY-CONTROLLED ISOLATED POWER DOMAINS

BACKGROUND

1. Technical Field

The technical field is data processing, or, more specifically, methods, apparatus, and products for a Decision Feedback Equalizer ('DFE') with a plurality of independently-controlled isolated power domains.

2. Description of Related Art

Serial chip-to-chip communications at very high speed data rate can be limited by channel loss and intersymbol interference that arise from physical characteristics of the data communications channel. An effective way for equalizing channel loss and negating the impact of intersymbol interference is to use a high performance Decision Feedback Equalizer ('DFE') in the receiver. A DFE often consumes a large portion of the receiver's power budget due to its complexity that results from the high speed and high performance requirements placed on the DFE.

SUMMARY

A high-performance, low power DFE comprising: a plurality of input signal lines comprising at least one data signal line and a plurality of power control signal lines; at least one output signal line; and a plurality of independently-controlled isolated power domains, wherein each independently-controlled isolated power domain is coupled to a corresponding one of the power control signal lines, each of the power control signal lines configured to transmit a power control signal to the independently-controlled isolated power domain dynamically, wherein each independently-controlled isolated power domain selectively consumes power in response to the power control signal, each independently-controlled isolated power domain configured to be dynamically powered up or powered down without impacting signal processing operations.

The foregoing and other objects, features and advantages will be apparent from the following more particular descriptions of example embodiments as illustrated in the accompanying drawings wherein like reference numbers generally represent like parts of example embodiments.

DETAILED DESCRIPTION OF EXAMPLE EMBODIMENTS

Figure 1:
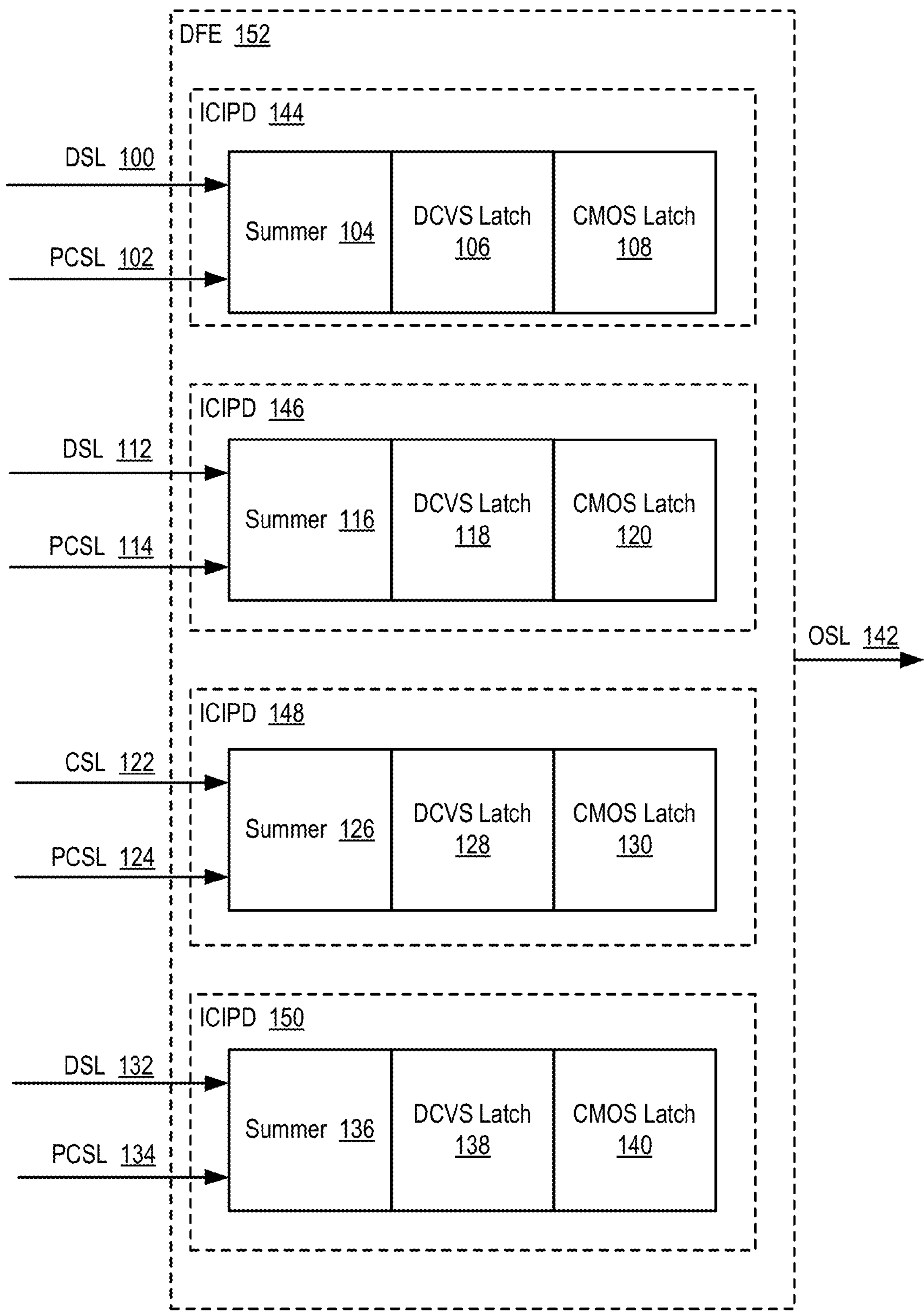
FIG. 1 sets forth a block diagram of an embodiment of a DFE.

Example methods, apparatus, and products for a Decision Feedback Equalizer ('DFE') with a plurality of independently-controlled isolated power domains are described with reference to the accompanying drawings, beginning with FIG. 1. FIG. 1 sets forth a block diagram of an embodiment of a DFE (152). The DFE (152) of FIG. 1 is a module of automated computing machinery, such as a circuit, for reversing the distortion incurred by a signal transmitted through a data communications channel. A signal transmitted through a data communications channel may be distorted, for example, by intersymbol interference in which a previously received signal impacts a presently received signal. The DFE (152) of FIG. 1 can augment a standard linear equalizer by adjusting an incoming signal in dependence upon information gathered during the receipt of previous signals. The DFE (152) of FIG. 1 may reside, for example, within a receiver that receives a digital signal from a sender, such that the DFE (152) can account for any channel loss or intersymbol interference that occurred in transmitting the digital signal from the sender to the receiver.

The DFE (152) of FIG. 1 includes a plurality of input signal lines. The input signal lines of FIG. 1 include at least one data signal line (100, 112, 122, 132). In the example of FIG. 1, each data signal line (100, 112, 122, 132) represents a data communications channel for receiving a digital signal that represents digital data. Such a digital signal can represent a sequence of discrete values, such as a binary 0 or a binary 1. The digital signal may be embodied, for example, as a waveform that switches between a high voltage level and a low voltage level that represent a discrete value such as a binary 0 or binary 1.

The input signal lines of FIG. 1 also include a plurality of power control signal lines (102, 114, 124, 134). The power control signal lines (102, 114, 124, 134) of FIG. 1 may be embodied, for example, as data communications channels that carry a digital signal that is used to determine whether a particular computing component will operate in a powered-up state or a powered-down state. For example, a first summer (104) may receive a power signal over a power control signal line (102) indicating that the summer (104) is to operate in a powered-down mode while another summer (106) may receive another power signal over a power control signal line (114) indicating that the summer (106) is to operate in a powered-up mode. In such a way, computing components within the DFE (152) may be powered-up and powered-down as needed, thereby potentially consuming less power than a DFE whose computing components always operate in a powered-up mode. In the example of FIG. 1, each independently-controlled isolated power domain (144, 146, 148, 150) is configured to be dynamically powered up or powered down without impacting signal processing operations. That is, once the DFE (152) is powered on and is equalizing incoming data signals, one or more of independently-controlled isolated power domain (144, 146, 148, 150) may be powered down with impacting the DFE's ability to equalize incoming data signals.

The DFE (152) of FIG. 1 also includes at least one output signal line (142). The output signal line (142) of FIG. 1 may be embodied as a data communications channel for transmitting a digital signal. In particular, the output signal line (142) of FIG. 1 may be embodied as a data communications channel for transmitting a digital signal that was received over one of the data signal lines (100, 112, 122, 132) and subsequently altered by the DFE (152), to correct for distortion that occurred to digital signal prior to receipt of the digital signal by the DFE (152).

The DFE (152) of FIG. 1 also includes a plurality of independently-controlled isolated power domains (144, 146, 148, 150). Each independently-controlled isolated power domains (144, 146, 148, 150) represents an aggregation of computing components in the DFE (152) that receive power from power sources that operate independently of other independently-controlled isolated power domains (144, 146, 148, 150). Each independently-controlled isolated power domains (144, 146, 148, 150) represents an aggregation of computing components in the DFE (152) that consume power independently of the operation of other independently-controlled isolated power domains (144, 146, 148, 150). Because each independently-controlled isolated power domains (144, 146, 148, 150) represents a power-consuming unit of the DFE (152) that operates and consumes power independently of other independently-controlled isolated power domains (144, 146, 148, 150), a first independently-controlled isolated power domain (144) may be operating in a powered-down state at some point in time while another independently-controlled isolated power domain (146) may be operating in a powered-down state at the same point in time. In such a way, the computing components within a particular independently-controlled isolated power domain (144, 146, 148, 150) may be powered-up on an as needed basis, such that the DFE (152) can limit its own power consumption.

In the example of FIG. 1, each independently-controlled isolated power domain (144, 146, 148, 150) includes a summer (104, 116, 126, 136). Each summer (104, 116, 126, 136) may be embodied, for example, as a summing amplifier for summing weighted values such as a plurality of weighted voltages. Each summer (104, 116, 126, 136) may be useful in restoring a digital signal received by the DFE (152) to the same state that the signal was transmitted by the sender, thereby overcoming the impact of channel loss or intersymbol interference by summing the received signal with values that are associated with previously received signals.

Consider an example in which a signal with a voltage of 1 V is a binary 1 and a signal with a voltage of 0 V is a binary 0. In such an example, assume that a bit pattern of '101' is transmitted from a sender to a receiver. During a first clock cycle, a summer (104, 116, 126, 136) would detect a signal of 1 V over a data signal line (100, 112, 122, 132). During a second clock cycle, even though the sender had transmitted a signal with a voltage level of 0 V, physical limitations of the data communications channel could cause some portion of the 1 V signal received during the first clock cycle to remain in the data communications channel. For example, the summer (104, 116, 126, 136) may detect a signal of 0.1 V over a data signal line (100, 112, 122, 132) during the second clock cycle, as some portion of the first signal is interfering with the second signal (i.e., through intersymbol interference). In such an example, the summer (104, 116, 126, 136) may also receive a feedback tap instructing the summer (104, 116, 126, 136) to add −0.1 V to the incoming signal in order to remove the impact of intersysmbol interference, such that the summer (104, 116, 126, 136) outputs a value of 0 V, accurately representing the current signal adjusted for the impact of intersymbol interference.

In the example of FIG. 1, each independently-controlled isolated power domain (144, 146, 148, 150) includes a DCVS latch (106, 118, 128, 138). Each DCVS latch (106, 118, 128, 138) in FIG. 1 may be embodied as a circuit configured to sample an incoming data signal that has potentially been modified and output by a summer (104, 116, 126, 136). Each DCVS latch (106, 118, 128, 138) in FIG. 1 can sample an incoming data signal with the aid of a clock signal received by the DCVS latch (106, 118, 128, 138) to identify sampling intervals. In the example of FIG. 1, each DCVS latch (106, 118, 128, 138) can be configured to sample a voltage as the incoming signal and output a binary value in dependence upon the voltage level of the incoming signal. For example, each DCVS latch (106, 118, 128, 138) can be configured to output a binary 0 upon sampling a signal with a voltage between −0.05 V and 0.05 V, and also configured to output a binary 1 upon sampling a signal with a voltage between 0.95 V and 1.05 V.

In the example of FIG. 1, each independently-controlled isolated power domain (144, 146, 148, 150) includes a CMOS latch (108, 120, 130, 140). Each CMOS latch (108, 120, 130, 140) of FIG. 1 may be embodied as a circuit configured to store state information. For example, each CMOS latch (108, 120, 130, 140) may be configured to store a value output from the corresponding DCVS latch (106, 118, 128, 138), such that the CMOS latch (108, 120, 130, 140) stores the binary value of a data signal received by the corresponding DCVS latch (106, 118, 128, 138). Readers will appreciate that although FIG. 1 illustrates a single CMOS latch (108, 120, 130, 140) coupled to a corresponding DCVS latch (106, 118, 128, 138), embodiments may include a plurality of CMOS latches (108, 120, 130, 140) coupled to each DCVS latch (106, 118, 128, 138), such that a sequence of binary values representing a sequence of data signals received by the corresponding DCVS latch (106, 118, 128, 138) may be retained.

In the example of FIG. 1, each independently-controlled isolated power domains (144, 146, 148, 150) is coupled to a corresponding one of the power control signal lines (102, 114, 124, 134). Each of the power control signal lines (102, 114, 124, 134) is configured to transmit a power control signal to the independently-controlled isolated power domain (144, 146, 148, 150). In the example of FIG. 1, each independently-controlled isolated power domain (144, 146, 148, 150) selectively consumes power in response to the power control signal. For example, if a power signal is received over a power control signal line (102) associated with an independently-controlled isolated power domain (144) indicating that all components within the independently-controlled isolated power domain (144) should not consume power, power may not be provided to any of the components in the independently-controlled isolated power domain (144). Likewise, if a power signal is received over a power control signal line (102) associated with an independently-controlled isolated power domain (144) indicating that all components within the independently-controlled isolated power domain (144) should consume power, power will be provided to all of the components in the independently-controlled isolated power domain (144).

In the example of FIG. 1, one of the independently-controlled isolated power domains (144, 146, 148, 150) is coupled to a calibration signal line (122). The calibration signal line (122) of FIG. 1 can be configured to transmit a calibration signal to the DFE. The calibration signal can include, for example, a value that represents the voltage threshold of a particular summer (104, 116, 126) within the DFE (152). When a particular summer (104, 116, 126) is not receiving any data or any taps generated as the result of a previously received signal, the output of the summer (104, 116, 126) should go to a predetermined voltage. In such an example, the calibration signal can include such a predetermined value, such that the output voltage of the summer (104,

116, 126) can be compared to the predetermined value in order to calibrate the summer (104, 116, 126).

Figure 2:
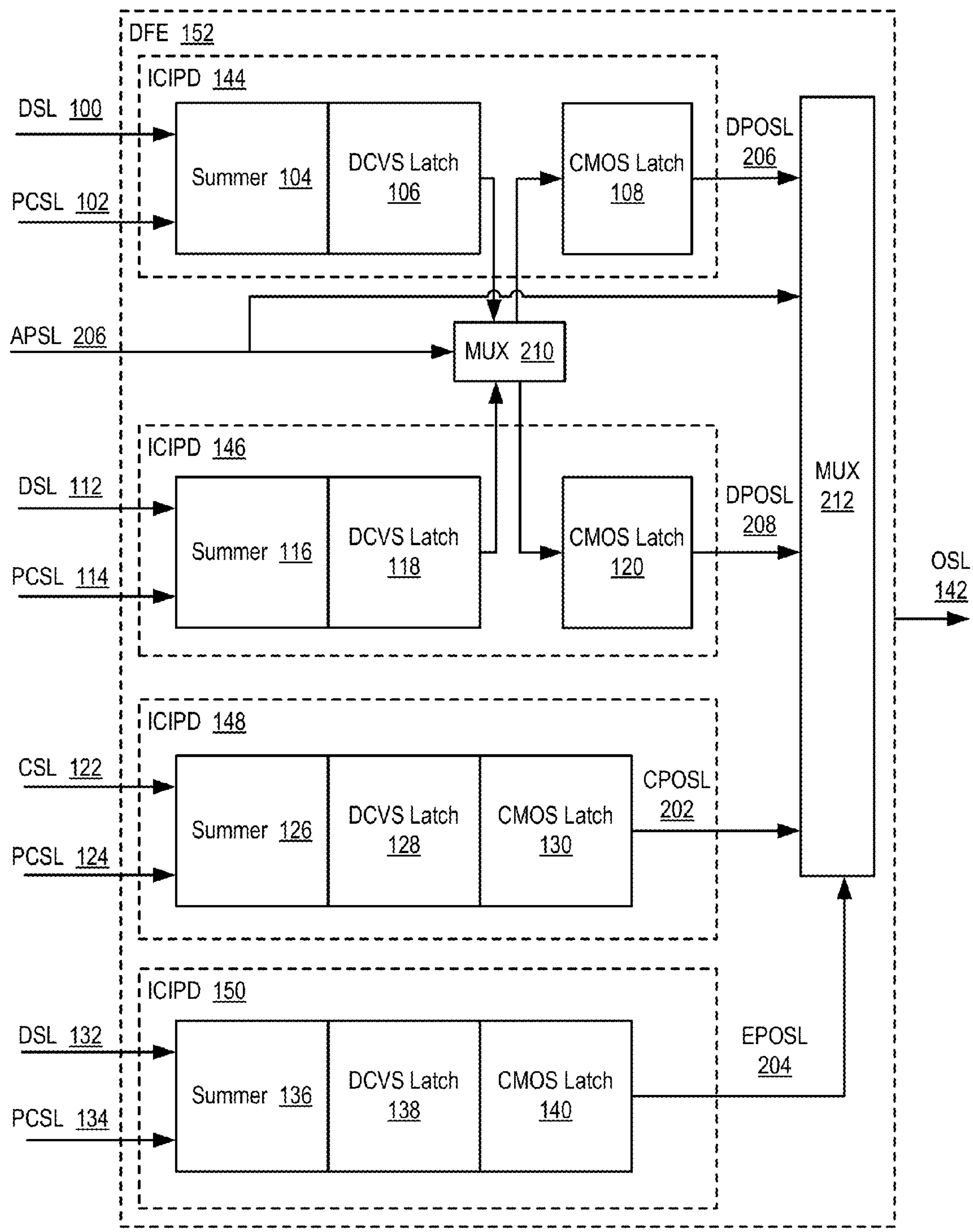
FIG. 2 sets forth a block diagram of an additional embodiment of a DFE.

For further explanation, FIG. 2 sets forth an additional block diagram of an embodiment of a DFE (152). The DFE (152) of FIG. 2 is similar to the DFE (152) of FIG. 1, as it also includes a plurality of input signal lines that include at least one data signal line (100, 112, 122, 132) and a plurality of power control signal lines (102, 114, 124, 134). The DFE (152) of FIG. 2 is also similar to the DFE (152) of FIG. 1 in that it includes at least one output signal line (142). The DFE (152) of FIG. 2 is also similar to the DFE (152) of FIG. 1 in that it includes a plurality of independently-controlled isolated power domains (144, 146, 148, 150) coupled to a corresponding one of the power control signal lines (102, 114, 124, 134) configured to transmit a power control signal to the independently-controlled isolated power domain (144, 146, 148, 150) that selectively consumes power in response to the power control signal.

In the example of FIG. 2, one of the independently-controlled isolated power domains (148) comprises a calibration path. In the example of FIG. 2, the calibration path represents independently-controlled isolated power domain (148) configured to calibrate computing components within the DFE (152). For example, the calibration path may be used to determine the proper biasing for other summers (104, 116, 126) in the DFE (152). In the example of FIG. 2, however, calibrating computing components within the DFE (152) may occur infrequently. As such, the calibration path is configured to receive a calibration path power signal over the power control signal line (134). In such an example, the calibration path power signal represents a value that is used to determine whether the computing components within the calibration path should be powered up or powered down. For example, when computing components within the DFE (152) are not being calibrated, the computing components within the calibration path may be powered down such that computing components within the DFE (152) that are not actively in use also do not consume power. When computing components within the DFE (152) need to be calibrated, the value of the calibration path power signal can be changed such that the computing components within the calibration path are powered up in order to perform the calibration operations.

In the example of FIG. 2, the calibration path is further configured to receive a calibration signal over a calibration signal line (122). In the example of FIG. 2, the calibration signal can include information used to perform calibration operations. For example, the calibration signal can include a value that represents the voltage threshold of a particular summer (104, 116, 126) within the DFE (152). When a particular summer (104, 116, 126) is not receiving any data or any taps generated as the result of a previously received signal, the output of the summer (104, 116, 126) should go to a predetermined voltage. In such an example, the calibration signal can include such a predetermined value, such that the output voltage of the summer (104, 116, 126) can be compared to the predetermined value in order to calibrate the summer (104, 116, 126).

In the example of FIG. 2, computing components within the calibration path can determine whether the calibration path power signal indicates that the calibration path can consume power. In response to determining that the calibration path power signal indicates that the calibration path can consume power, computing components within the calibration path can generate a calibration value in dependence upon the calibration signal. The calibration value represents a value that is used to calibrate a computing component within the DFE (152). For example, the calibration value can include a value representing the amount that the output voltage of a particular summer (104, 116, 126) should be adjusted so as to be consistent with the voltage threshold of the summer (104, 116, 126) as indicated by the calibration signal. In such an example, the calibration value may be output by the calibration path over a calibration path output signal line (202).

In the example of FIG. 2, one of the independently-controlled isolated power domains (150) comprises an edge path. The edge path represents an independently-controlled isolated power domain (150) configured to perform clock alignment operations within the DFE (152). Although not illustrated in FIG. 2, multiple clocks are used in data communications operations and digital signal processing operations carried out by the DFE (152). In order for the DFE (152) to function properly, many of the data signals and clock signals must be properly aligned and synchronized. The edge path is configured to carry out such alignment and synchronization. The edge path may be configured, for example, to receive an input data signal that contains alignment information for one or more data signals or clock signals in the DFE (152). The edge path may further be configured to receive an edge clock signal that is to be used to align other signals within the DFE (152). In such an example, the edge path can generate one or more edge values in dependence upon the input data signal and the edge clock signal, where the edge value represents an amount of time that a particular signal should be shifted so as to be properly aligned with other signals in the DFE (152). In such an example, the edge values may be output from the edge path via an edge path output signal line (204).

In the example of FIG. 2, two of the independently-controlled isolated power domains (144, 146) comprise optional data paths. In the example of FIG. 2, each optional data path can be configured to process the incoming data signal that is received by the DFE (152). Each optional data path is 'optional' in the sense that at a given point in time only one of the paths needs to be operational for the purposes of processing the incoming data signal that is received by the DFE (152). As such, only one of the independently-controlled isolated power domains (144, 146) needs to be powered on at a given point in time in order to process the incoming data signal that is received by the DFE (152). As such, only one of the optional data paths is an active data path.

In the example of FIG. 2, one of the optional data paths is selected as an active data path in dependence upon an active path input signal. In the example of FIG. 2, the active path input signal may be embodied as a data value used to determine which optional data path will be designated as the active data path. For example, when the active path input signal has a value of 0, the first independently-controlled isolated power domain (144) may be powered up to serve as the active data path. Alternatively, when the active path input signal has a value of 1, the second independently-controlled isolated power domain (146) may be powered up to serve as the active data path. The active path input signal may be received, for example, over an active path signal line (206).

In the example of FIG. 2, each optional data path is configured to receive an input data signal over a corresponding data signal line (100, 112). Although each optional data path is configured to receive an input data signal over a corresponding data signal line (100, 112), only the active data path will process the incoming data signal. As described above, the input data signal may be embodied as a digital signal that represents digital data. Such a digital signal can represent a sequence of discrete values, such as a binary 0 or a binary 1. The digital signal may be embodied, for example, as a waveform that switches between a high voltage level and a low voltage level that represent a discrete value such as a binary 0 or binary 1.

In the example of FIG. 2, each optional data path is further configured to determine whether a voltage level of the input data signal has been impacted by one or more previously received input data signals. Although each optional data path is configured to determine whether a voltage level of the input data signal has been impacted by one or more previously received input data signals, only the active data path will actually perform this function at a particular point in time. In the example method of FIG. 2, determining whether a voltage level of the input data signal has been impacted by one or more previously received input data signals may be carried out, for example, by retaining a predetermined number of previously received input data signals in memory and inspecting the values of the previously received input data signals.

Consider the example described above in which in which a signal with a voltage of 1 V is a binary 1 and a signal with a voltage of 0 V is a binary 0. In such an example, determining whether a voltage level of the input data signal has been impacted by one or more previously received input data signals may be carried out by inspecting a predetermined number of previously received input data signals to identify previously received input data signals that had a binary value 1. Such signals introduce a voltage into the data communications channel and therefore have the ability to impact a currently received input data signal as residual voltage from a previously received binary 1 may still reside in the data communications channel.

In the example of FIG. 2, each optional data path is further configured to adjust the voltage level of the currently received input data signal in response to determining that the voltage level of the input data signal has been impacted by the one or more previously received input data signals. In the example of FIG. 2, adjusting the voltage level of the currently received input data signal may be carried out through the use of one or more summers (104, 116) in the active data path. In such an example, the summers (104, 116) may receive the data signal and one or more tap values for adjusting the voltage level of the data signal to remove the effects of intersymbol interference.

In the example of FIG. 2, the DFE (152) is depicted as having two multiplexers (210, 212). From the perspective of the data paths, the multiplexers (210, 212) may be useful in allowing the DFE (152) to operate as a half-rate DFE where each signal that is output from the data path can be directed to different output signal lines (142) via the data path output signal lines (206, 208). For example, the binary values representing an incoming signal received on an even numbered clock cycle can be output on a first output signal line (142) while the binary values representing an incoming signal received on an odd numbered clock cycle can be output on a different output signal line (not shown).

Readers will appreciate that only one output signal line (142) is illustrated in FIG. 2, embodiments of the DFE (152) may include many output signal lines. For example, the DFE (152) may include multiple signal lines for data values for half-rate operation as described above. Likewise, the DFE (152) may include output signal lines for transmitting edge values, calibration values, and the like. The depiction of a single output signal line (142) is included for ease of illustration and does not represent a limitation of the DFE (152) described herein.

Readers will further appreciate that although only one of the optional data paths will be used as the active data path that processes data signals received by the DFE (152) at a given point in time, the inactive data path may be optionally used to carry out other functions performed by the DFE (152). For example, the inactive data path may be used for dynamic amplitude control. Because only one of the optional data paths will be used as the active data path, the DFE (152) is configured such that other power domains (i.e., power domains that are not operating as the active data path) may be dynamically powered up or powered down without impacting signal processing operations.

Figure 3:
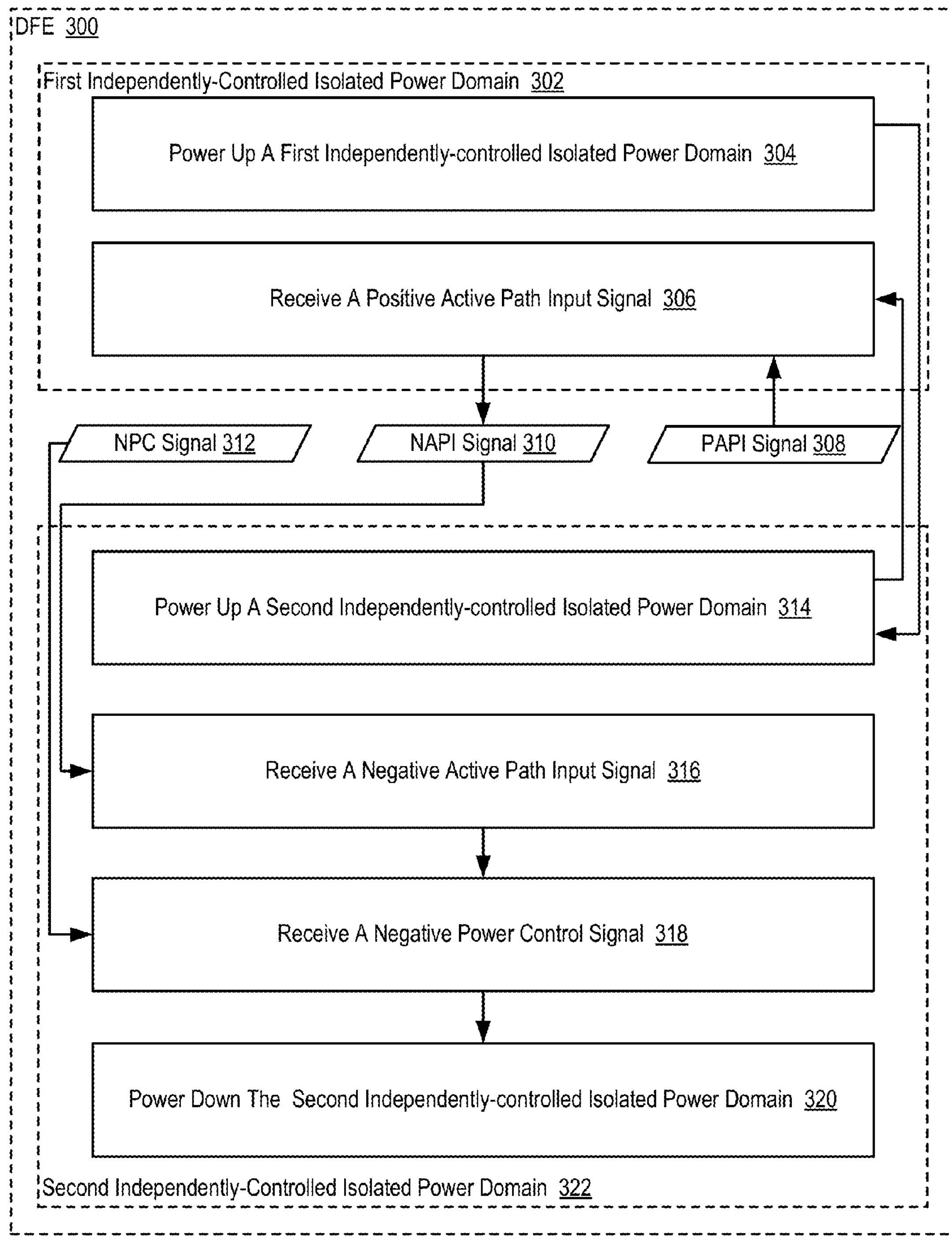
FIG. 3 sets forth a flow chart illustrating an example method for controlling power consumption in a DFE that includes a plurality of independently-controlled isolated power domains.

For further explanation, FIG. 3 sets forth a flow chart illustrating an example method for controlling power consumption in a DFE (152) that includes a plurality of independently-controlled isolated power domains (302, 322). Although the DFE (300) in FIG. 3 is depicted as only including two independently-controlled isolated power domains (302, 322), readers will appreciate that the DFE (300) may be similar to the DFEs depicted in FIG. 1 and FIG. 2, which have four independently-controlled isolated power domains. For example, the independently-controlled isolated power domains (302, 322) of FIG. 3 can represent the optional data paths described above, such that only one of the optional data paths is processing incoming data signals at a particular point in time.

The example method of FIG. 3 includes powering (304) up a first independently-controlled isolated power domain (302). In the example method of FIG. 3, powering (304) up a first independently-controlled isolated power domain (302) may be carried out, for example, by providing power from a power supply to the computing components within the first independently-controlled isolated power domain (302). In such an example, some components within the first independently-controlled isolated power domain (302) may be designed to consume power only when an input signal, such as a clock signal or input voltage, is oscillating such that powering up such components can include oscillating the clock signal or input voltage. Upon powering (304) up a first independently-controlled isolated power domain (302), the first independently-controlled isolated power domain (302) is consuming power.

The example method of FIG. 3 also includes powering (314) up a second independently-controlled isolated power domain (322). In the example method of FIG. 3, powering (314) up a second independently-controlled isolated power domain (322) may be carried out, for example, by providing power from a power supply to the computing components within the second independently-controlled isolated power domain (322). In such an example, some components within the second independently-controlled isolated power domain (322) may be designed to consume power only when an input signal, such as a clock signal or input voltage, is oscillating such that powering up such components can include oscillating the clock signal or input voltage. Upon powering (314) up a second independently-controlled isolated power domain (322), the second independently-controlled isolated power domain (322) is consuming power.

The example method of FIG. 3 also includes receiving (306), by the first independently-controlled isolated power domain (302), a positive active path input signal (308). In the example method of FIG. 3, the an active path input signal may be embodied as a predefined voltage level, binary value, or signal that is used to designate a particular independently-controlled isolated power domain as the active data path as described above. The positive active path input signal (308) of FIG. 3 is signal indicating that the independently-controlled isolated power domain that receives the positive active path input signal (308) should operate as the active data path. Because the positive active path input signal (308) is received (306) by the first independently-controlled isolated power domain (302), the first independently-controlled isolated power domain (302) will remain powered up and ready to process incoming data signals.

The example method of FIG. 3 also includes receiving (316), by the second independently-controlled isolated power domain (322), a negative active path input signal (310). In the example method of FIG. 3, the an active path input signal may be embodied as a predefined voltage level, binary value, or signal that is used to designate a particular independently-controlled isolated power domain as the active data path as described above. The negative active path input signal (310) of FIG. 3 is signal indicating that the independently-controlled isolated power domain that receives the negative active path input signal (310) should not operate as the active data path. Because the negative active path input signal (310) is received (316) by the second independently-controlled isolated power domain (322), the second independently-controlled isolated power domain (322) will not be required to process incoming data signals and, as such, the second independently-controlled isolated power domain (322) can be powered down to reduce the amount of power consumed by the DFE (300).

The example method of FIG. 3 also includes receiving (318), by the second independently-controlled isolated power domain (322), a negative power control signal (312). In the example method of FIG. 3, the negative power control signal (312) represents a signal that, when received by a particular independently-controlled isolated power domain, indicates that the independently-controlled isolated power domain should power down. The negative power control signal (312) may be embodied, for example, as a predetermined voltage value, as a binary value, and so on.

The example method of FIG. 3 also includes powering (320) down the second independently-controlled isolated power domain (322). In the example method of FIG. 3, powering (320) down the second independently-controlled isolated power domain (322) is carried out in response to receiving the negative power control signal (312). Powering (320) down the second independently-controlled isolated power domain (322) may be carried out, for example, by turning off all power supplies that provide power to the computing components within the second independently-controlled isolated power domain (322). In such an example, some components within the second independently-controlled isolated power domain (322) may be designed to consume power only when an input signal, such as a clock signal or input voltage, is oscillating such that powering down such components can include holding the clock signal or input voltage steady. Upon powering (320) down the second independently-controlled isolated power domain (322), the second independently-controlled isolated power domain (322) is no longer consuming power, thereby reducing the total amount of power consumed by the DFE (300). Readers will appreciate that the second independently-controlled isolated power domain (322) may be powered (320) down without impacting signal processing operations, as the first independently-controlled isolated power domain (302) will continue to perform signal processing operations.

In an example in which the independently-controlled isolated power domains (302, 322) of FIG. 3 represent the optional data paths described above, the method of FIG. 3 can be useful for reducing the total amount of power consumed by the DFE (300). The method of FIG. 3 can be useful for reducing the total amount of power consumed by the DFE (300) by designating a particular independently-controlled isolated power domain (302) as the active data path, designating the other independently-controlled isolated power domain (322) as the inactive data path, and powering down the inactive data path, thereby reducing the total amount of power consumed by the DFE (300).

Figure 4:
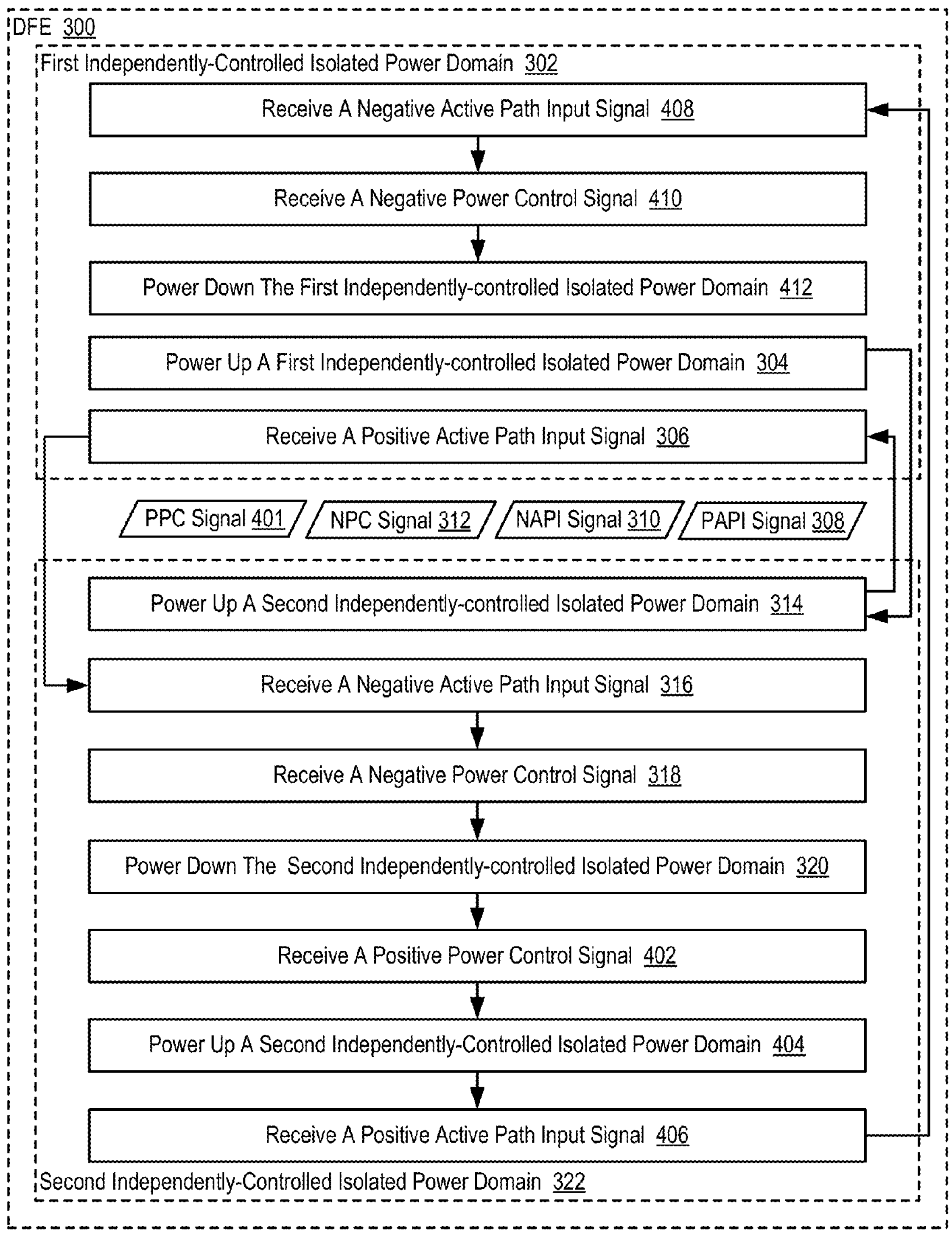
FIG. 4 sets forth a flow chart illustrating an additional example method for controlling power consumption in a DFE that includes a plurality of independently-controlled isolated power domains.

For further explanation, FIG. 4 sets forth a flow chart illustrating an additional example method for controlling power consumption in a DFE (152) that includes a plurality of independently-controlled isolated power domains (302, 322). Although the DFE (300) in FIG. 3 is depicted as only including two independently-controlled isolated power domains (302, 322), readers will appreciate that the DFE (300) may be similar to the DFEs depicted in FIG. 1 and FIG. 2, which have four independently-controlled isolated power domains. For example, the independently-controlled isolated power domains (302, 322) of FIG. 3 can represent the optional data paths described above, such that only one of the optional data paths is processing incoming data signals at a particular point in time.

The example method of FIG. 4 is similar to the example method of FIG. 3 as it also includes powering (304) up a first independently-controlled isolated power domain (302), powering (314) up a second independently-controlled isolated power domain (322), receiving (306) a positive active path input signal (308), receiving (316) a negative active path input signal (310), receiving (318) a negative power control signal (312), and powering (320) down the second independently-controlled isolated power domain (322). After the steps described above have been carried out, the DFE (300) can be operating in a mode in which the first independently-controlled isolated power domain (302) is powered up and acting as the active data path, while the second independently-controlled isolated power domain (322) is acting as the inactive data path and therefore powered down to reduce overall power consumption in the DFE (300).

The example method of FIG. 4 also includes receiving (402), by the second independently-controlled isolated power domain (322), a positive power control signal (401). In the example method of FIG. 4, the positive power control signal (401) may be embodied as a predefined voltage level, binary value, or signal that is used as an indication that the independently-controlled isolated power domain receiving the positive power control signal (401) should be powered on.

The example method of FIG. 4 also includes powering (404) up the second independently-controlled isolated power domain (322). In the example method of FIG. 4, powering (404) up the second independently-controlled isolated power domain (322) is carried out in response to receiving the positive power control signal (401). Powering (404) up the second independently-controlled isolated power domain (322) may be carried out, for example, by providing power from a power supply to the computing components within the second independently-controlled isolated power domain (322). In such an example, some components within the second independently-controlled isolated power domain (322) may be designed to consume power only when an input signal, such as a clock signal or input voltage, is oscillating such that powering up such components can include oscillating the clock signal or input voltage. Upon powering (404) up the second independently-controlled isolated power domain (322), the second independently-controlled isolated power domain (322) is consuming power.

The example method of FIG. 4 also includes receiving (406), by the second independently-controlled isolated power domain (322), a positive active path input signal (308). In the example method of FIG. 4, the an active path input signal may be embodied as a predefined voltage level, binary value, or signal that is used to designate a particular independently-controlled isolated power domain as the active data path as described above. The positive active path input signal (308) of FIG. 4 is signal indicating that the independently-controlled isolated power domain that receives the positive active path input signal (308) should operate as the active data path. Because the positive active path input signal (308) is received (406) by the second independently-controlled isolated power domain (322), the second independently-controlled isolated power domain (322) will remain powered up and ready to process incoming data signals.

The example method of FIG. 4 also includes receiving (408), by the first independently-controlled isolated power domain (302), a negative active path input signal (310). In the example method of FIG. 4, the an active path input signal may be embodied as a predefined voltage level, binary value, or signal that is used to designate a particular independently-controlled isolated power domain as the active data path as described above. The negative active path input signal (310) of FIG. 4 is signal indicating that the independently-controlled isolated power domain that receives the negative active path input signal (310) should not operate as the active data path. Because the negative active path input signal (310) is received (408) by the first independently-controlled isolated power domain (302), the first independently-controlled isolated power domain (302) will not be required to process incoming data signals and, as such, the first independently-controlled isolated power domain (302) can be powered down to reduce the amount of power consumed by the DFE (300).

The example method of FIG. 4 also includes receiving (410), by the first independently-controlled isolated power domain (302), a negative power control signal (312). In the example method of FIG. 4, the negative power control signal (312) represents a signal that, when received by a particular independently-controlled isolated power domain, indicates that the independently-controlled isolated power domain should power down. The negative power control signal (312) may be embodied, for example, as a predetermined voltage value, as a binary value, and so on.

The example method of FIG. 4 also includes powering (412) down the first independently-controlled isolated power domain (302). In the example method of FIG. 4, powering (412) down the first independently-controlled isolated power domain (302) is carried out in response to receiving the negative power control signal (312). Powering (412) down the first independently-controlled isolated power domain (302) may be carried out, for example, by turning off all power supplies that provide power to the computing components within the first independently-controlled isolated power domain (302). In such an example, some components within the first independently-controlled isolated power domain (302) may be designed to consume power only when an input signal, such as a clock signal or input voltage, is oscillating such that powering down such components can include holding the clock signal or input voltage steady. Upon powering (412) down the first independently-controlled isolated power domain (302), the first independently-controlled isolated power domain (302) is no longer consuming power, thereby reducing the total amount of power consumed by the DFE (300). Readers will appreciate that the first independently-controlled isolated power domain (302) may be powered (412) down without impacting signal processing operations because the second independently-controlled isolated power domain (322) will continue to perform signal processing operations.

In an example in which the independently-controlled isolated power domains (302, 322) of FIG. 4 represent the optional data paths described above, the method of FIG. 4 can be useful for reducing the total amount of power consumed by the DFE (300). The method of FIG. 4 can be useful for reducing the total amount of power consumed by the DFE (300) by swapping the active data path from being the first independently-controlled isolated power domain (302) to being the second independently-controlled isolated power domain (322). In such an example, once the second independently-controlled isolated power domain (322) has been powered up and designated as the active data path, the first independently-controlled isolated power domain (302) is designated as the inactive data path and ultimately powered down, thereby reducing the total amount of power consumed by the DFE (300).

Figure 5:
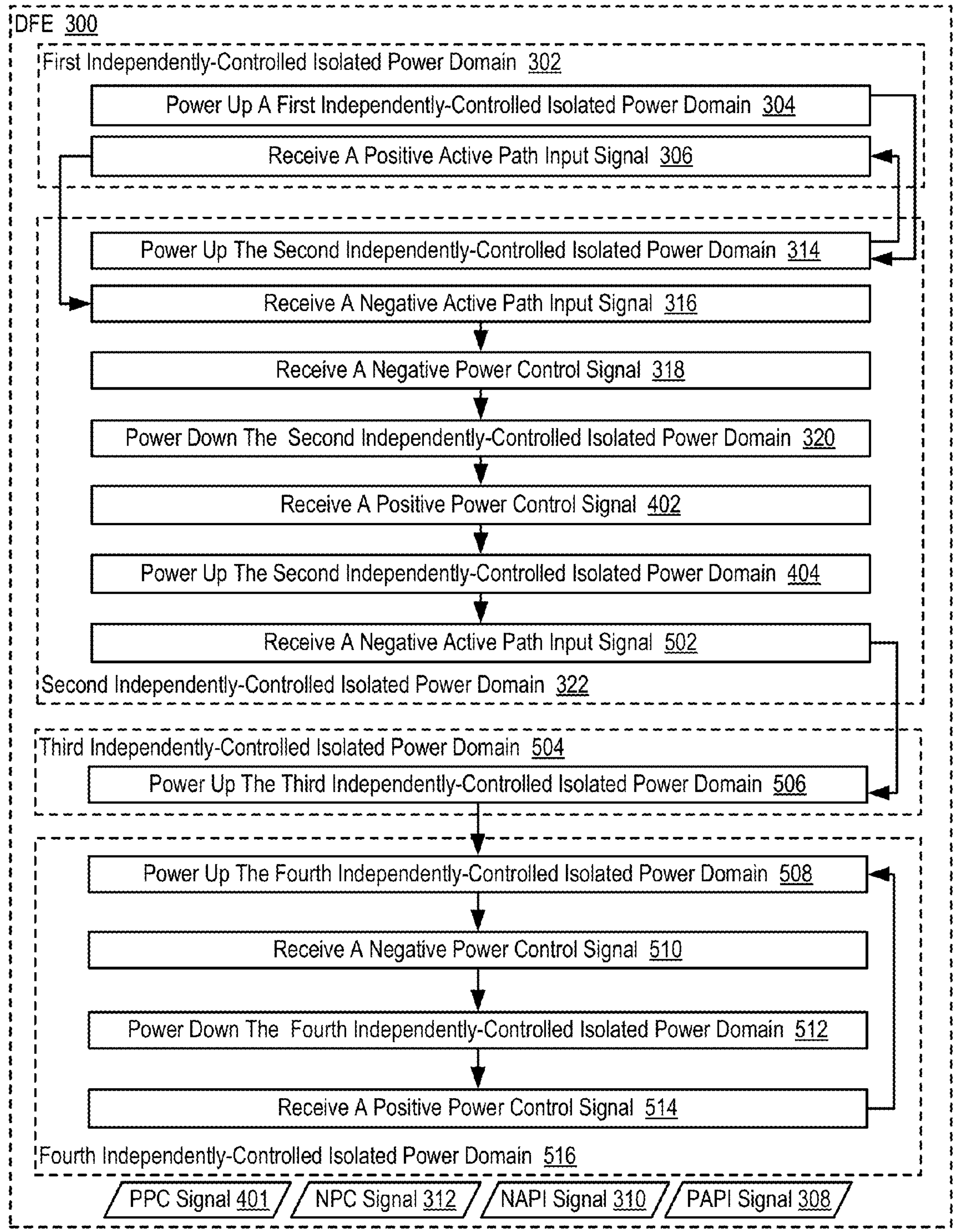
FIG. 5 sets forth a flow chart illustrating an additional example method for controlling power consumption in a DFE that includes a plurality of independently-controlled isolated power domains.

For further explanation, FIG. 5 sets forth a flow chart illustrating an additional example method for controlling power consumption in a DFE (152) that includes a plurality of independently-controlled isolated power domains (302, 322, 504, 516). Readers will appreciate that the DFE (300) may be similar to the DFEs depicted in FIG. 1 and FIG. 2. For example, the first independently-controlled isolated power domain (302) and the second independently-controlled isolated power domain (322) of FIG. 4 can represent the optional data paths described above, the third independently-controlled isolated power domain (504) can represent the edge path described above, and the fourth independently-controlled isolated power domain (516) can represent the calibration path described above.

The example method of FIG. 5 can also include receiving (402), by the second independently-controlled isolated power domain (322), a positive power control signal (401). In the example method of FIG. 5, the positive power control signal (401) may be embodied as a predefined voltage level, binary value, or signal that is used as an indication that the independently-controlled isolated power domain receiving the positive power control signal (401) should be powered on.

The example method of FIG. 5 can also include powering (404) up the second independently-controlled isolated power domain (322). In the example method of FIG. 5, powering (404) up the second independently-controlled isolated power domain (322) may be carried out in response to receiving the positive power control signal (401). Powering (404) up the second independently-controlled isolated power domain (322) may be carried out, for example, by providing power from a power supply to the computing components within the second independently-controlled isolated power domain (322). In such an example, some components within the second independently-controlled isolated power domain (322) may be designed to consume power only when an input signal, such as a clock signal or input voltage, is oscillating such that powering up such components can include oscillating the clock signal or input voltage. Upon powering (404) up the second independently-controlled isolated power domain (322), the second independently-controlled isolated power domain (322) is consuming power.

The example method of FIG. 5 can also include receiving (502), by the second independently-controlled isolated power domain (322), a negative active path input signal (310). In the example method of FIG. 5, the an active path input signal may be embodied as a predefined voltage level, binary value, or signal that is used to designate a particular independently-controlled isolated power domain as the active data path as described above. The negative active path input signal (310) of FIG. 5 is signal indicating that the independently-controlled isolated power domain that receives the negative active path input signal (310) should not operate as the active data path. Because the negative active path input signal (310) is received (502) by the second independently-controlled isolated power domain (322), the second independently-controlled isolated power domain (322) will not be required to process incoming data signals. However, given that the second independently-controlled isolated power domain (322) was powered (404) up after being previously being powered down, the second independently-controlled isolated power domain (322) may be powered up (404) to serve in another role other than acting as the active data path. For example, the second independently-controlled isolated power domain (322) may be powered up (404) to carry out dynamic amplitude control as described above.

The example method of FIG. 5 can also include powering (506) up a third independently-controlled isolated power domain (504). The third independently-controlled isolated power domain (504) may be powered (506) up, for example, to operate as the edge path as described above. The edge path represents an independently-controlled isolated power domain (504) configured to perform clock alignment operations within the DFE (300). Although not illustrated in FIG. 5, multiple clocks are used in data communications operations and digital signal processing operations carried out by the DFE (300). In order for the DFE (300) to function properly, many of the data signals and clock signals must be properly aligned and synchronized. The edge path is configured to carry out such alignment and synchronization. The edge path may be configured, for example, to receive an input data signal that contains alignment information for one or more data signals or clock signals in the DFE (300). The edge path may further be configured to receive an edge clock signal that is to be used to align other signals within the DFE (300). In such an example, the edge path can generate one or more edge values in dependence upon the input data signal and the edge clock signal, where the edge value represents an amount of time that a particular signal should be shifted so as to be properly aligned with other signals in the DFE (300). Because the functions carried out by the edge path are useful for ensuring proper operation of the DFE (300), in the example method of FIG. 5 the third independently-controlled isolated power domain (504) is never powered down so long as it serves as the edge path.

The example method of FIG. 5 can also include powering (508) up a fourth independently-controlled isolated power domain (516). In the example method of FIG. 5, the fourth independently-controlled isolated power domain (516) may be powered (508), for example, in response to receiving a positive power control signal (401) upon the initialization of the DFE (300). In the example method of FIG. 5, the fourth independently-controlled isolated power domain (516) may be powered (508) can serve as the calibration path as described above. Because calibration operations are not continuously required during the operation of the DFE (300), however, the fourth independently-controlled isolated power domain (516) may be powered (508) may be powered down unless otherwise performing calibration operations.

The example method of FIG. 5 can therefore include receiving (510), by the fourth independently-controlled isolated power domain (516), a negative power control signal (312). In the example method of FIG. 5, the negative power control signal (312) represents a signal that, when received by a particular independently-controlled isolated power domain, indicates that the independently-controlled isolated power domain should power down. The negative power control signal (312) may be embodied, for example, as a predetermined voltage value, as a binary value, and so on.

The example method of FIG. 5 can also include powering (512) down the fourth independently-controlled isolated power domain (516). In the example method of FIG. 5, powering (512) down the fourth independently-controlled isolated power domain (516) is carried out in response to receiving the negative power control signal (312). Powering (512) down the fourth independently-controlled isolated power domain (516) may be carried out, for example, by turning off all power supplies that provide power to the computing components within the fourth independently-controlled isolated power domain (516). In such an example, some components within the fourth independently-controlled isolated power domain (516) may be designed to consume power only when an input signal, such as a clock signal or input voltage, is oscillating such that powering down such components can include holding the clock signal or input voltage steady. Upon powering (512) down the fourth independently-controlled isolated power domain (516), the fourth independently-controlled isolated power domain (516) is no longer consuming power, thereby reducing the total amount of power consumed by the DFE (300).

The example method of FIG. 5 can also include receiving (514), by the fourth independently-controlled isolated power domain (516), a positive power control signal (401). In the example method of FIG. 5, the fourth independently-controlled isolated power domain (516) may serve as the calibration path as described above. As such, the positive power control signal (401) may be received (514) by the fourth independently-controlled isolated power domain (516) in order to initiate the performance of calibration operations. In response to receiving (514) the positive power control signal (401), the fourth independently-controlled isolated power domain (516) may be powered (508) up.

Figure 6:
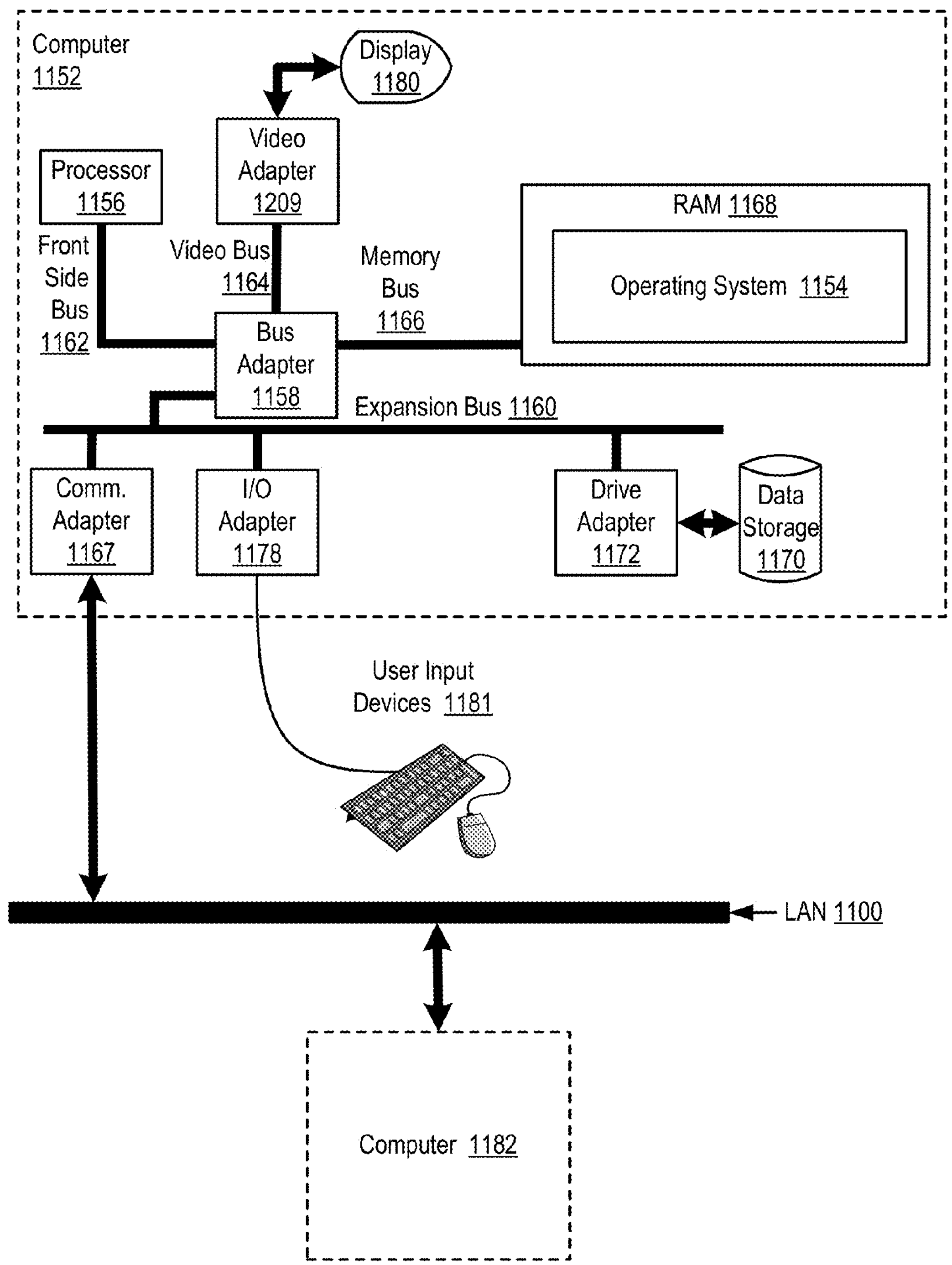
FIG. 6 sets forth a block diagram of automated computing machinery comprising an example computer useful in controlling power consumption in a DFE that includes a plurality of independently-controlled isolated power domains

FIG. 6 sets forth a block diagram of automated computing machinery comprising an example computer (1152) useful in controlling power consumption in a DFE that includes a plurality of independently-controlled isolated power domains. The computer (1152) of FIG. 6 includes at least one computer processor (1156) or 'CPU' as well as random access memory (1168) ('RAM') which is connected through a high speed memory bus (1166) and bus adapter (1158) to processor (1156) and to other components of the computer (1152).

The computer (1152) of FIG. 6 can include a DFE similar to the DFEs depicted in FIG. 1 and FIG. 2, which have four independently-controlled isolated power domains. The computer (1152) of FIG. 6 can be configured to: power up a first independently-controlled isolated power domain, power up a second independently-controlled isolated power domain, receive a positive active path input signal by the first independently-controlled isolated power domain, receive a negative active path input signal by the second independently-controlled isolated power domain, receive a negative power control signal by the second independently-controlled isolated power domain, and powering down the second independently-controlled isolated power domain.

Also stored in RAM (1168) is an operating system (1154). Operating systems useful controlling power consumption in a DFE that includes a plurality of independently-controlled isolated power domains include UNIX™, Linux™, Microsoft XP™, AIX™, IBM's i5/OS™, and others as will occur to those of skill in the art. The operating system (1154) in the example of FIG. 6 is shown in RAM (1168) but may also be stored in non-volatile memory also, such as, for example, on a disk drive (1170).

The computer (1152) of FIG. 6 includes disk drive adapter (1172) coupled through expansion bus (1160) and bus adapter (1158) to processor (1156) and other components of the computer (1152). Disk drive adapter (1172) connects non-volatile data storage to the computer (1152) in the form of disk drive (1170). Disk drive adapters useful in computers for controlling power consumption in a DFE that includes a plurality of independently-controlled isolated power domains include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (1152) of FIG. 6 includes one or more input/output ('I/O') adapters (1178). I/O adapters implement user-oriented input/output through, for example, software drivers and computer hardware for controlling output to display devices such as computer display screens, as well as user input from user input devices (1181) such as keyboards and mice. The example computer (1152) of FIG. 6 includes a video adapter (209), which is an example of an I/O adapter specially designed for graphic output to a display device (1180) such as a display screen or computer monitor. Video adapter (1209) is connected to processor (1156) through a high speed video bus (1164), bus adapter (1158), and the front side bus (1162), which is also a high speed bus.

The example computer (1152) of FIG. 6 includes a communications adapter (1167) for data communications with other computers (1182) and for data communications with a data communications network (1100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for controlling power consumption in a DFE that includes a plurality of independently-controlled isolated power domains include modems for wired dial-up communications, Ethernet (IEEE 802.3) adapters for wired data communications network communications, and 802.11 adapters for wireless data communications network communications.

As will be appreciated by one skilled in the art, embodiments may be include a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments are described above with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments without departing from its true spirit. The descriptions in this specification are for purposes of illustration only and are not to be construed in a limiting sense. The scope of the present application is limited only by the language of the following claims.

What is claimed is:

1. A Decision Feedback Equalizer ('DFE'), the DFE comprising:

a plurality of summing amplifiers;

a plurality of input signal lines comprising a plurality of data signal lines (DSL) and a plurality of power control signal lines (PCSL);

at least one output signal line; and a plurality of independently-controlled isolated power domains (ICIPD), wherein a summing amplifier in each ICIPD is coupled to a corresponding one of the PCSL and also coupled to a corresponding one of the DSL, each of the PCSL configured to transmit a power control signal to the ICIPD, wherein each ICIPD selectively consumes power in response to the power control signal, each ICIPD configured to be dynamically powered up or powered down without impacting signal processing operations, wherein a second ICIPD from the plurality of ICIPD is powered up by receiving a positive power control signal and consumes power only when the second ICIPD is powered up, then the second ICIPD receives a negative active input signal indicating that the second ICIPD cannot operate as an active data path and the second ICIPD is not required to process incoming data signals from the respective DSL; then a third ICIPD from the plurality of ICIPD is powered up to operate as an edge path for performing clock alignment operations within the DFE and cannot be powered down so long as it serves as the edge path; then a fourth ICIPD is powered up after receiving the positive power control signal for serving as a calibration path for the DFE and is powered down only when the calibration has finished; then the fourth ICIPD receives a negative power control signal indicating that the fourth ICIPD should powered down by turning off power supplies that provide power to computing components within the fourth ICIPD only when an input clock signal is steady.

2. The DFE of claim 1 wherein the calibration path is configured to:

receive a calibration signal and a calibration path power signal;

determine whether the calibration path power signal indicates that the calibration path can consume power; and responsive to determining that the calibration path power signal indicates that the calibration path can consume power, generate a calibration value in dependence upon the calibration signal.

3. The DFE of claim 1 wherein the edge path is configured to:

receive an input data signal and an edge clock signal; and generate edge values in dependence upon the input data signal and the edge clock signal.

4. The DFE of claim 1 wherein two of the ICIPD comprise optional data paths, each optional data path configured to:

receive an input data signal;

determine whether a voltage level of the input data signal has been impacted by one or more previously received input data signals; and responsive to determining that the voltage level of the input data signal has been impacted by the one or more previously received input data signals, adjusting the voltage level of the input data signal.

5. The DFE of claim 4 wherein one of the optional data paths is an active data path.

6. The DFE of claim 4 wherein one of the optional data paths is selected as an active data path in dependence upon an active path input signal.

7. A method of controlling power consumption in a Decision Feedback Equalizer ('DFE') that includes a plurality of independently-controlled isolated power domains, the method comprising:

powering up a first independently-controlled isolated power domain (ICIPD) and a second ICIPD;

receiving, by a summing amplifier in the first ICIPD via a first power control signal line (PCSL), a positive active path input signal, the summing amplifier in the first ICIPD coupled to the first PCSL and also coupled to a first data signal line (DSL);

receiving, by a summing amplifier in the second ICIPD via a second PCSL, a negative active path input signal and a negative power control signal, the summing amplifier in the second ICIPD coupled to the second PCSL and also coupled to a second DSL; and powering down the second ICIPD without impacting signal processing operations in response to receiving the negative power control signal, wherein the second ICIPD from the plurality of ICIPD is powered up by receiving a positive power control signal and consumes power only when the second ICIPD is powered up, then the second ICIPD receives a negative active path input signal indicating that the second ICIPD cannot operate as an active data path and the second ICIPD is not required to process incoming data signals from the respective DSL; then a third ICIPD from the plurality of ICIPD is powered up to operate as an edge path for performing clock alignment operations within the DFE and cannot be powered down so long as it serves as the edge path; then a fourth ICIPD is powered up after receiving the positive power control signal for serving as a calibration path for the DFE and is powered down only when the calibration has finished; then the fourth ICIPD receives a negative power control signal indicating that the fourth ICIPD should powered down by turning off power sullies that provide power to computing components within the fourth ICIPD only when an input clock signal is steady.

8. The method of claim 7 further comprising:

receiving, by the second ICIPD, a positive power control signal;

powering up the second ICIPD in response to receiving the positive power control signal; and receiving, by the second ICIPD, a negative active path input signal.

9. The method of claim 7 further comprising powering up the third ICIPD.

10. The method of claim 9 further comprising:

powering up the fourth ICIPD;

receiving, by the fourth ICIPD, a negative power control signal; and powering down the fourth ICIPD in response to receiving the negative power control signal.

11. The method of claim 10 further comprising:

receiving, by the fourth ICIPD, a positive power control signal; and powering up the fourth ICIPD in response to receiving the positive power control signal.

12. A computer program product for controlling power consumption in a Decision Feedback Equalizer ('DFE') that includes a plurality of independently-controlled isolated power domains (ICIPD), the computer program product disposed upon a non-transitory computer readable storage medium, the computer program product comprising computer program instructions that, when executed, cause a computer to carry out the steps of:

powering up a first ICIPD and a second ICIPD;

receiving, by a summing amplifier in the first ICIPD via a first power control signal line (PCSL), a positive active path input signal, the summing amplifier in the first ICIPD coupled to the first PCSL and also coupled to a first data signal line (DSL);

receiving, by a summing amplifier in the second ICIPD via a second PCSL, a negative active path input signal and a negative power control signal, the summing amplifier in the second ICIPD coupled to the second PCSL and also coupled to a second DSL; and powering down the second ICIPD without impacting signal processing operations in response to receiving the negative power control signal, wherein the second ICIPD from the plurality of ICIPD is powered up by receiving a positive power control signal and consumes power only when the second ICIPD is powered up, then the second ICIPD receives a negative active path input signal indicating that the second ICIPD cannot operate as an active data path and the second ICIPD is not required to process incoming data signals from the respective DSL; then a third ICIPD from the plurality of ICIPD is powered up to operate as an edge path for performing clock alignment operations within the DFE and cannot be powered down so long as it serves as the edge path; then a fourth ICIPD is powered up after receiving the positive power control signal for serving as a calibration path for the DFE and is powered down only when the calibration has finished; then the fourth ICIPD receives a negative power control signal indicating that the fourth ICIPD should powered down by turning off power supplies that provide power to computing components within the fourth ICIPD only when an input clock signal is steady.

13. The computer program product of claim 12 further comprising computer program instructions that, when executed, cause the computer to carry out the steps of:

receiving, by the second ICIPD, a positive power control signal;

powering up the second ICIPD in response to receiving the positive power control signal; and receiving, by the second ICIPD, a negative active path input signal.

14. The computer program product of claim 12 further comprising computer program instructions that, when executed, cause the computer to carry out the step of powering up the third ICIPD.

15. The computer program product of claim 14 further comprising computer program instructions that, when executed, cause the computer to carry out the steps of:

powering up the fourth ICIPD;

receiving, by the fourth ICIPD, a negative power control signal; and powering down the fourth ICIPD in response to receiving the negative power control signal.

16. The computer program product of claim 15 further comprising computer program instructions that, when executed, cause the computer to carry out the steps of:

receiving, by the fourth ICIPD, a positive power control signal; and powering up the fourth ICIPD in response to receiving the positive power control signal.

17. The computer program product of claim 12 wherein the computer readable storage medium comprises a recordable medium.

* * * * *